T. CRUMLING.
Harvester.
No. 25,559.   Patented Sept. 27, 1859.
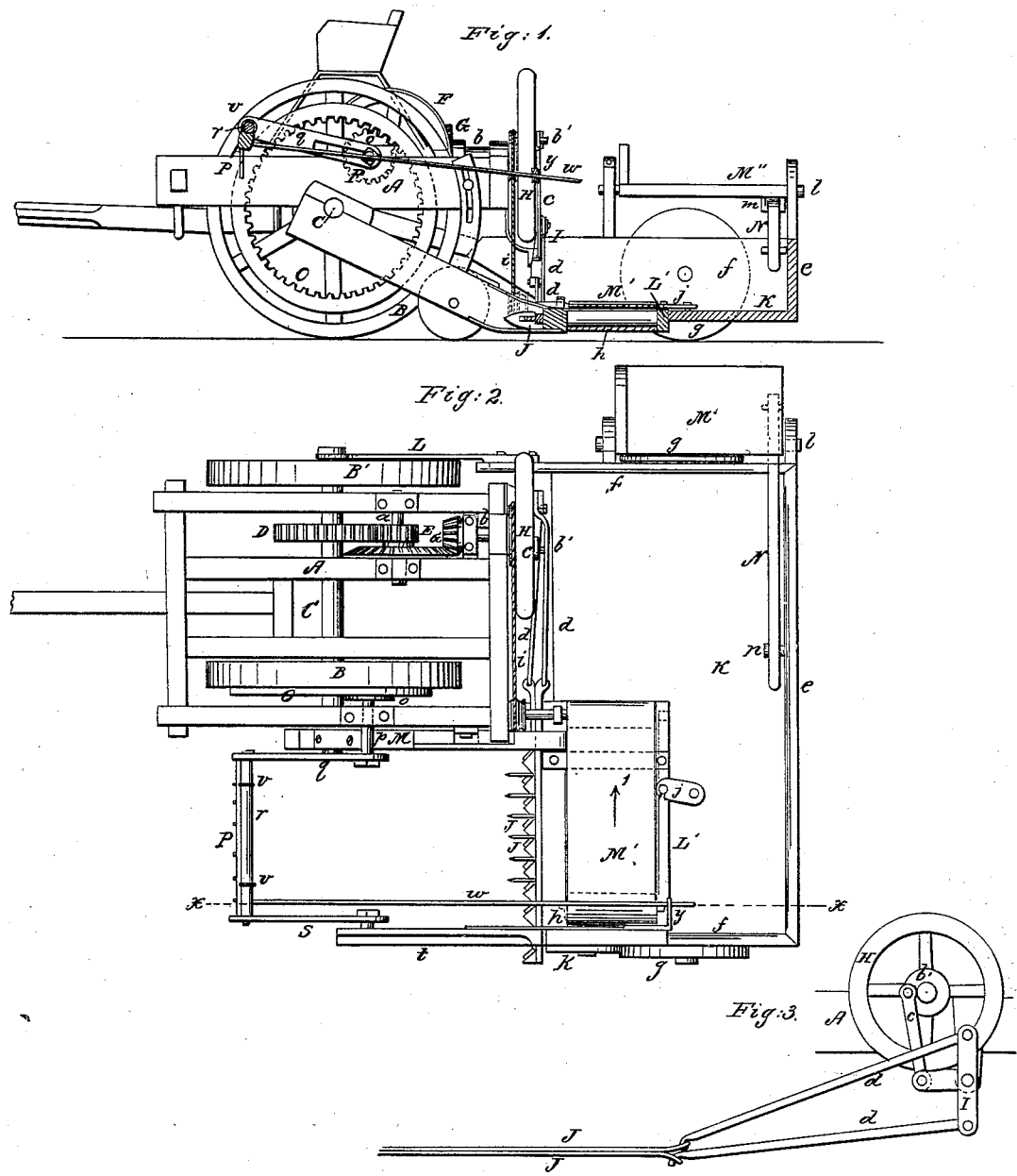
Witnesses:
Henry B. Hartzler
John Fox.
Inventor:
Tobias Crumling.

UNITED STATES PATENT OFFICE.

TOBIAS CRUMLING, OF HELLAM, PENNSYLVANIA.

IMPROVEMENT IN HARVESTERS.

Specification forming part of Letters Patent No. 25,559, dated September 27, 1859.

*To all whom it may concern:*

Be it known that I, TOBIAS CRUMLING, of Hellam, in the county of York and State of Pennsylvania, have invented a new and Improved Harvester; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a plan or top view of the same; Fig. 3, a detached face view of the sickle-driving mechanism.

Similar letters of reference indicate corresponding parts in the several figures.

To enable those skilled in the art to fully understand and construct my invention, I will proceed to describe it.

A represents the main frame of the machine. This main frame is of rectangular form, and is mounted on two wheels, B B′, the frame being counterpoised on their axle C, so as to relieve the team of any weight of the same. The wheel B is the driving-wheel, and is permanently attached to its axle C, the axle and wheel rotating together; but the wheel B′ is placed loosely on the axle C. This arrangement facilitates the turning of the machine. On the axle C a toothed wheel, D, is placed. This wheel gears into a pinion, E, the shaft $a$ of which has a bevel-wheel, F, on it. The bevel-wheel F gears into a bevel-pinion, G, the shaft $b$ of which passes through the back part of frame A, and has a fly-wheel, H, on it. This fly-wheel H has a pin, $b'$, fitted in it a short distance from its axis, and forming a crank to which a pitman, $c$, is attached, the lower end of the pitman being connected to one end of a T-shaped lever, I, the other two ends being connected by pitman $d\,d$ to sickles J J, which are provided with the usual saw-toothed cutters, (see Fig. 2,) one sickle working over the other and simultaneously in opposite directions. This will be clearly understood by referring to Fig. 3.

K represents a platform of rectangular form, having a vertical back piece, $e$, and sides $f\,f$. This platform is considerably wider than the main frame A, and is attached to it by bars L M, the front ends of which are fitted loosely on the ends of the axle C, so as to admit of the platform conforming to the inequalities of the surface of the ground. The platform K is supported by two wheels, $g\,g$, one at each side.

In a frame, L′, which is fitted in the platform K at one side of the main frame A, two rollers, $h\,h$, are placed, around which an endless apron, M′, passes, said apron being directly behind the sickles J J, and equal to them in length. (See Fig. 2.) The apron M′ moves in the direction indicated by arrow $l$, and is actuated by the belt $i$ from shaft $b$. The frame L′ is attached to the platform K by a simple hook, $j$, so as to admit of an independent adjustment or movement of the former to conform to the inequalities of the surface of the ground. The outer end of frame, L, is supported by a wheel, $k$. To one side of the platform K—the "off" side—a platform, M″, is attached by journals or pivots $l$, and is allowed to swing thereon. This platform is retained in a horizontal position by a bar, N, the outer end of which is attached by a joint, $m$, to the under side of the platform, and the inner end fitted on a pin, $n$, attached to the inner side of the back piece, $e$.

To the outer side of the wheel B a concentric toothed rim, O, is attached. This rim O is toothed on its inner side, and a pinion, $o$, gears into said rim, the pinion being on a shaft, $p$, in the main frame A.

To the outer end of the shaft $p$ an arm, $q$, is attached, and to the outer end of the arm $q$ one end of a rod, $r$, is secured at right angles, the opposite end of said rod being attached to a corresponding arm, $s$, which is pivoted to the front end of a horizontal bar, $t$, that is secured by uprights to the frame L′.

To the rod $r$ a rake, P, is attached by eyes or straps $v'\,v$, which encompass the rod $r$ loosely, so that the rake may swing freely thereon.

To the rake P a rod, $w$, is attached, which acts as a guide, said rod passing through an eye, $y$, at the back end of the bar $t$.

The operation is as follows: As the machine is drawn along, the sickles J J, in consequence of the reciprocating movement given them by the lever I, cut the grass or grain, the sickles being allowed to rise and fall to conform to the inequalities of the surface of the ground in consequence of the way in which the frame L′ is secured to the platform K, aided also by the way in which the latter is attached to the main frame A. The sickle-driving mechanism shown in Fig. 3, it will be seen, will not be at all affected by the adjustable movement of the platform K and frame L'. The rake P is made to revolve by means of the arms $q\ s$, shaft $p$, and gearing $o\ O$, and as the rake P is suspended loosely on the rod $r$, the rake as it rotates will, with the assistance of rod $w$, remain in a vertical position, and thereby have a tendency, not only to perform the function of a reel, but also to raise lodged grain or grass and present the same properly to the sickles. This is a very important feature of the invention, for lodged grass or grain has not hitherto been cut with any degree of perfectness by a machine. The rake P, operating as described, also perfects the cutting operation as the machine turns, as it will always present the grass or grain in a proper position to the sickles. The arms $q\ s$, it will be observed, are slotted, and may therefore be adjusted so as to bring the rake-rod $r$ nearer to or remove it farther from the shaft $p$. The extent of stroke or throw of the rake P is thus conveniently regulated.

In the cutting of grain, binders stand on the platform K, and the cut grain falls on the apron M', which conveys it on the platform K, directly behind the main frame A, where it is bound and placed on the platform M'', which, when filled, or when it arrives at the proper place, is tilted and the sheaves discharged from the machine, so as to form shocks.

I do not claim the two reciprocating sickles J J moving in reverse directions, for they have been previously used. Neither do I claim an endless apron, M', behind the sickles J J, for that has also been previously used; but,

Having thus described my invention, what I do claim as new, and desire to secure by Letters Patent, is—

The arrangement and combination, as herein shown and described, of the independent platform K with the frame L', belt M', and driving-axle C, for the purpose set forth.

TOBIAS CRUMLING.

Witnesses:
HENRY B. HARTZLER,
JOHN FOX.